Figure 1:
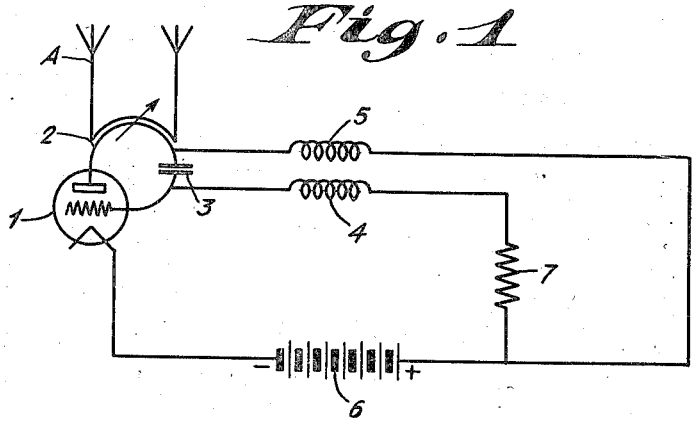

March 23, 1937. D. PRINZ ET AL 2,074,857

TRANSMITTER

Filed Jan. 6, 1934

INVENTOR
FELIX HERRIGER
DIETRICH PRINZ
BY
ATTORNEY

Patented Mar. 23, 1937

2,074,857

UNITED STATES PATENT OFFICE 2,074,857

TRANSMITTER

Dietrich Prinz and Felix Herriger, Berlin, Germany, assignors to Telefunken Gesellschaft fur Drahtlose Telegraphie m. b. H., Berlin, Germany, a corporation of Germany Application January 6, 1934, Serial No. 705,596
In Germany January 6, 1933

5 Claims. (Cl. 250—36)

The present invention relates to an electron tube transmitter with low-temperature (dull) cathode.

The invention is concerned with valve or tube transmitters operating with high or ultra-high frequency oscillations, more particularly with transmitter equipment comprising a tube whose cathode has a relatively low temperature, such as, for instance, oxide-cathode tubes. In tubes of this kind, in the presence of a high plate load, re-heating or reactive heating of the cathode is produced which is conducive to an increase in emission and thus in the plate current, which, in turn, tends to result in a further growth of the plate losses. This process is liable to run its course until the tube is destroyed by overload.

According to the invention ways and means are therefore provided in a transmitter of the kind here concerned which make conditions so that upon an increase of emission there is produced an increase of the negative biasing potential of the grid. Such a rise of the biasing potential has the tendency to diminish the plate current of the tube so that the re-heating process is limited and that a stable state is attained even at such plate loads where operation would no longer be feasible without the use of such remedying means as are here disclosed.

The stabilizing grid potential change may be produced by the grid current, the plate current, or by both. The transmitter circuit arrangement here shown by way of example is the so-called Hartley short-wave circuit scheme in which the arrangement here described has been proved to be particularly successful. In this circuit arrangement, the inductance of the oscillation circuit is inserted between grid and plate, the capacity of the oscillation circuit resides in the grid-plate capacitance of the tube, while the feedback is obtained by the capacitive voltage division by the cathode-grid and the cathode-plate capacity.

The novel features of our invention have been pointed out with particularity in the claims at the end of the specification. The nature of our invention, and circuit arrangements for carrying out the same, may be understood from the following detailed description when read in connection with the accompanying drawing wherein like reference characters indicate like parts and wherein Figures 1 to 3 inclusive show various circuit arrangements including means for providing a protective voltage on the grid electrode during operation of the device.

Referring to the drawing, 1 denotes the oscillator tube, 2 the inductance clip or loop, and 3 the blocking condenser to separate the grid and the plate for direct current circuits. The grid direct current voltage may be supplied to the grid and a terminal of the said condenser by way of the grid choke coil 4, while the plate potential may be fed to the plate and to the other terminal of condenser 3 by way of the plate choke coil 5. 6 is the source of the plate potential.

Now, if by a change in grid current there is to be produced an alteration in grid potential adequate for stabilization, then the grid resistance must be chosen substantially higher than customary for the production of the normal grid biasing voltage. As a result there is produced by the grid direct current across its terminals such a high fall of potential that operation is practically impossible if, in line with usual practice the grid resistance is united with the cathode or with a potential which is negative with respect to the cathode.

According to the invention, the grid resistance is therefore connected to a point having such a high positive potential that the drop of voltage occasioned by the grid direct current is substantially compensated and that there remains only the grid biasing voltage required for the normal operation of the tube. The simplest plan is to unite the grid resistance with the positive pole of the plate potential source. This embodiment is shown in Fig. 1 where the grid resistance is indicated at 7.

Figure 2:
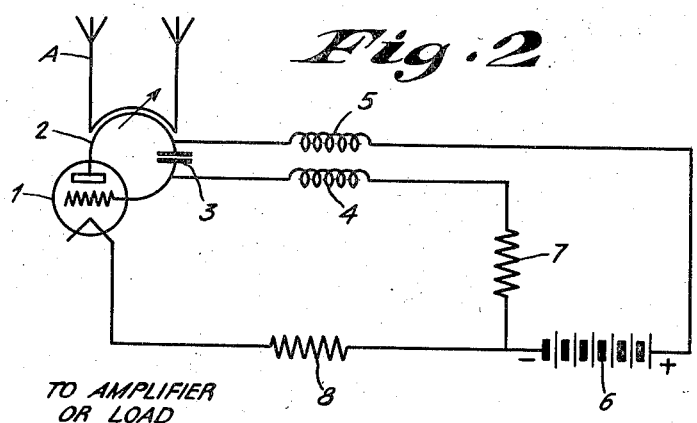

In order to produce the stabilizing grid voltage changes by the plate current, all that is necessary is to interpose a suitably chosen resistance 8 between the cathode and the negative pole of the plate potential source as shown in Fig. 2, the grid being united with the negative pole of the plate potential source either directly or else by way of a resistance 7.

Figure 3:
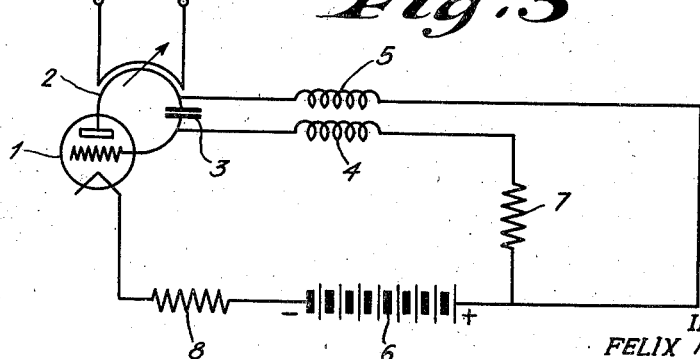

Finally the arrangements shown in Figs. 1 and 2 could be combined as shown in Fig. 3. In this scheme, a resistance 8 is included between the cathode and the negative pole of the plate potential source, a fall of potential being produced by the plate current across the said resistance 8; and between the grid choke coil and the positive pole of the plate potential source there is inserted a high resistance 7 across the terminals of which a stabilizing voltage is produced by the grid current.

Stabilization could be further improved by the use of resistances assuming higher values with growth of current, such as incandescent lamps with a metal filament, the use of such metal filament lamps having proved particularly favorable for resistance 8.

Having thus described our invention and the operation thereof, what we claim is:

1. In a transmitter, a thermionic oscillation generator tube having an anode, a cathode and a control grid, an oscillatory circuit suitable for the production of oscillations including a condenser directly connected between said anode and control grid, a source of potential having its negative terminal connected to the cathode of said tube through a resistance, a connection between the positive terminal of said source and that plate of said condenser which is directly connected to said anode, and a connection including a resistance between said control grid and one of said terminals, whereby the biasing potential supplied to said grid is stabilized.

2. In a transmitter, an oscillation generator comprising a thermionic tube having an anode, a cathode and a control grid electrode, an oscillatory circuit including a condenser directly connected to said anode and control grid, a source of potential having its negative terminal connected to the cathode of said tube through a resistance and its positive terminal connected to the anode of said tube, a connection including a relatively high resistance between the control grid of said tube and the positive terminal of said source for supplying biasing potentials to the control grid of the said tube, said last resistance being adapted to vary the biasing potential applied to the control grid of said tube when the intensity of the current supplied to the anode of said tube changes.

3. A regenerative oscillation generator circuit comprising an electron discharge device having an anode, a cathode and grid, a feed back circuit including a condenser, a direct connection between said anode and one terminal of said condenser and a direct connection between said grid and the other terminal of said condenser, a source of potential having positive and negative terminals, a circuit comprising the series combination of a choke coil and a high resistance between said grid and the positive terminal of said source, another circuit including a choke coil between said anode and said positive terminal of said source, and a connection between said cathode and the negative terminal of said source, whereby there is produced an increase in the negative bias potential applied to said grid with an increase in electron emission from said cathode.

4. A regenerative oscillation generator circuit comprising an electron discharge device having an anode, a cathode and grid, a feed back circuit including a condenser, a direct connection between said anode and one terminal of said condenser and a direct connection between said grid and the other terminal of said condenser, a source of potential having positive and negative terminals, a circuit comprising the series combination of a choke coil and a high resistance between said grid and the positive terminal of said source, another circuit including a choke coil between said anode and said positive terminal of said source, and a connection including a resistance between said cathode and the negative terminal of said source, whereby there is produced an increase in the negative bias potential applied to said grid with an increase in electron emission from said cathode.

5. In combination, an electron discharge device generator having an anode, a cathode and a grid, an oscillatory circuit including a condenser having plates directly connected to said anode and grid, a source of potential having its negative terminal connected to said cathode and its positive terminal connected to said anode, and a high resistance connected between said grid and said positive terminal for providing a protective biasing potential to said grid when the intensity of the electron emission current supplied to said anode changes.

DIETRICH PRINZ.
FELIX HERRIGER.